United States Patent [19]
Mermi et al.

[11] 3,912,213
[45] Oct. 14, 1975

[54] FIXING CLAMP FOR SECURING FIN, TUBE OR LIKE RADIATORS OF ALL KINDS TO A WALL OR LIKE SURFACE

[75] Inventors: Kurt Mermi, Emmendingen; Wolfgang Schmelzle, Amoltern; Adolf Bappert, Denzlingen; Werner Tutsch, Emmendingen, all of Germany

[73] Assignee: Upat-Max Langensiepen KG, Emmendingen, Germany

[22] Filed: May 20, 1974

[21] Appl. No.: 471,975

[30] Foreign Application Priority Data
May 19, 1973 Germany............................ 2325524
Apr. 13, 1974 Germany............................ 2418204

[52] U.S. Cl. ............................................. 248/233
[51] Int. Cl.² ......................................... F24H 9/06
[58] Field of Search........ 248/232, 233, 251, 316 C, 248/234

[56] References Cited
UNITED STATES PATENTS

| 1,674,358 | 6/1928 | Frank | 248/233 |
| 1,773,188 | 8/1930 | Kehm | 248/233 |
| 1,799,558 | 4/1931 | Howard | 248/251 X |
| 1,878,187 | 9/1932 | Ruff | 248/233 |
| 3,687,184 | 8/1972 | Wagner | 251/37 |

FOREIGN PATENTS OR APPLICATIONS
1,559,984  2/1969  France............................... 248/232

*Primary Examiner*—William H. Schultz
*Attorney, Agent, or Firm*—Michael S. Striker

[57] ABSTRACT

A fixing clamp for securing fin, tube or like radiators of all kinds to a wall comprises a clamping plate, a counter-plate to be positioned between the tubes, fins or like parts of a radiator, a fixing screw having a shaft coupling portion and having a thread at one end, and a head coupling portion at the opposite end for tightening the clamping plate and the counterplate on said parts of the radiator, an insert associated with the counterplate and rotatably fast therewith, and slip coupling means embracing either of said coupling portions of the fixing screw. The counter-plate is dimensional to conform with the shape of the parts of the radiator which it grips.

16 Claims, 12 Drawing Figures

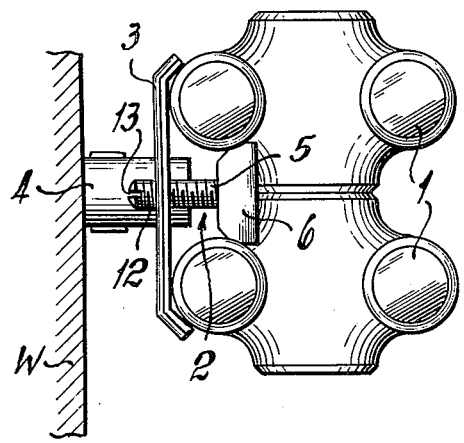
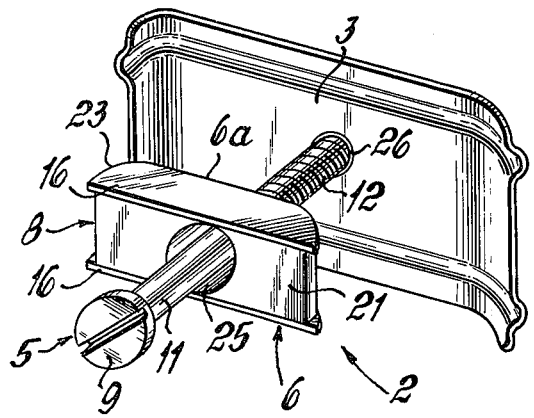
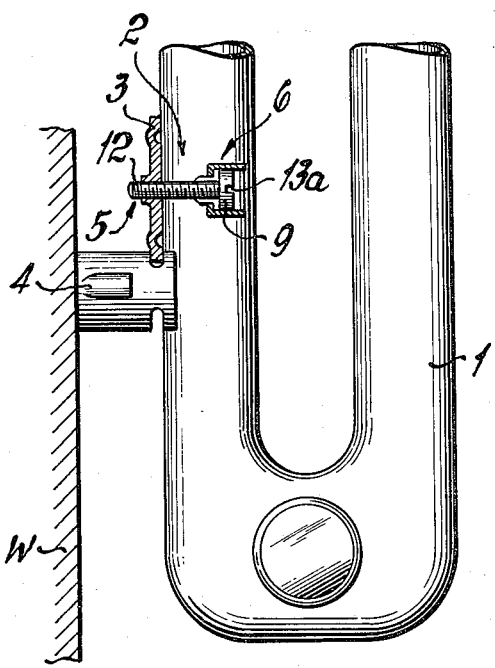
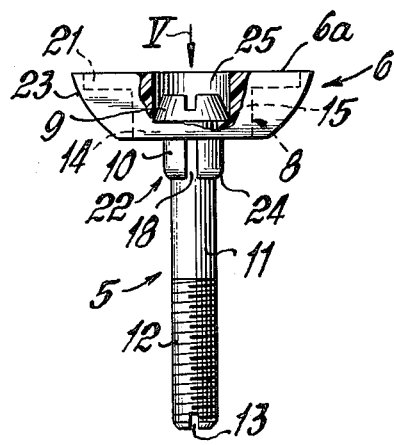
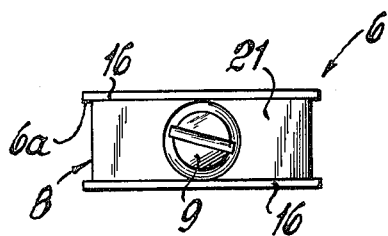

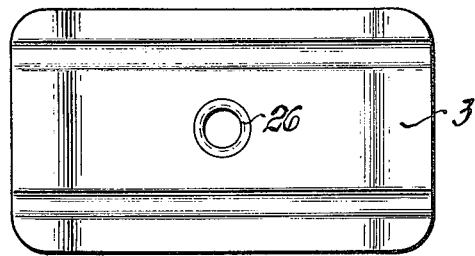
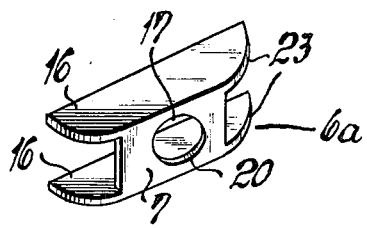
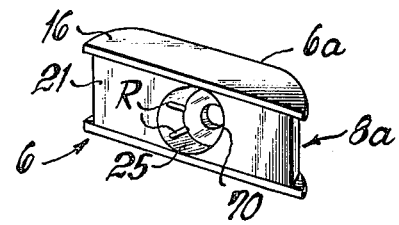
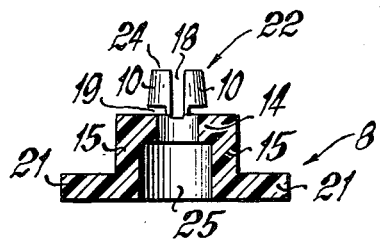
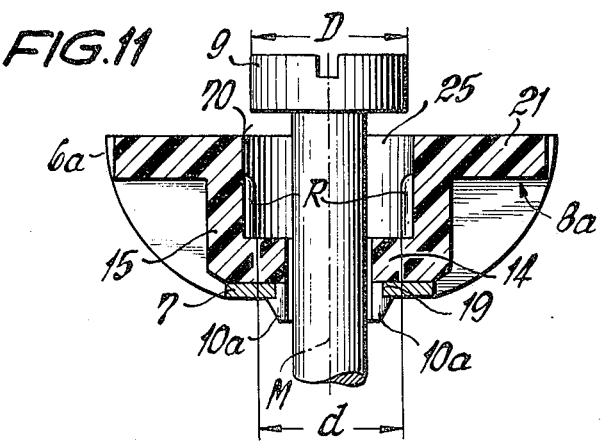
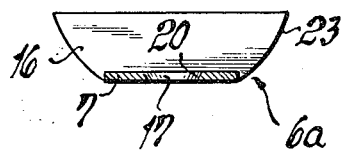
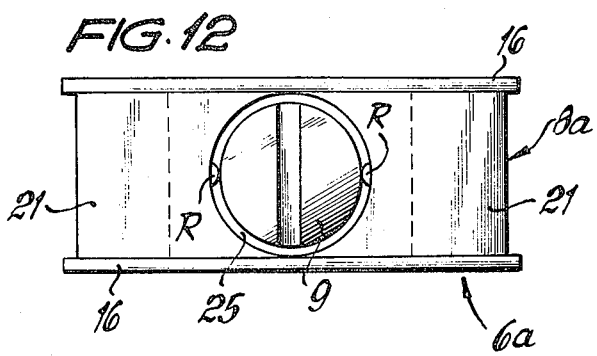

FIXING CLAMP FOR SECURING FIN, TUBE OR LIKE RADIATORS OF ALL KINDS TO A WALL OR LIKE SURFACE

BACKGROUND OF THE INVENTION

This invention relates generally to fixing clamps for securing fin, tube or like radiators of all kinds to a wall or like surface, comprising a clamping plate, a counterplate to be positioned between the tubes, fins or like parts of a radiator, and a fixing screw for tightening the clamping plate and the counterplate on said parts of the radiator.

Clamps for fixing radiators, comprising a clamp and counterplate which can be tightened by turning a screw, are well known in the art. However, in practice the process of fixing a radiator with the aid of such a clamp is awkward because the counterplate must be manipulated into an inaccessible position between the fins of the radiator before it can be secured.

For assembly the counterplate must first be inserted between the radiator fins and then turned into a transverse position. In this position which is difficult to achieve by manual control the exact location must be adjusted in an awkward way for instance with the aid of an auxiliary tool and then maintained during fixation in a manner that takes up much time. For instance, it is generally necessary to apply a screwdriver from the other side of the radiator and to hold the clamp in position whilst the screwdriver is being turned.

SUMMARY OF THE INVENTION

It is therefore the object of the invention to provide a clamp for fixing radiators which is more convenient to secure.

To attain this object the present invention provides a fixing clamp for securing fin, tube or like radiators of all kinds to a wall or like surface, which comprises a clamping plate adapted to be placed against the side of a radiator which faces a wall; a counterplate to be positioned between the tubes, fins or like parts of the radiator; a fixing screw in the form of a shaft having a thread at one end and a head at the opposite end for tightening the clamping plate and the counterplate on said parts of the radiator, and an insert associated with the counterplate and rotatably fast therewith and arranged in a manner forming a kind of slip coupling to embrace the said opposite end of the shaft of the fixing screw, the counterplate being shaped in a conventional manner to conform with the shape of the parts of the radiator which it grips and said clamping plate being adapted to rest on a holder which projects from the wall towards the radiator.

This means that the counterplate and the insert through both of which the fixing screw has been passed can be pushed between the radiator ribs by an operator holding the assembly by the screw shaft, and that the counterplate together with the insert can then be turned through 90° into the required fitting position simply by turning the screw shaft. Hence the special manipulations otherwise needed for bringing the counterplate into its allotted place can be saved.

Preferably the threaded end of the fixing screw may be provided with a transverse slot or like configuration for the application thereto of a screwdriver or like tool. After the clamping plate has been engaged by the fixing screw a screwdriver can thus be applied to the threaded end of the fixing screw and the clamp pulled tight in this way. This is an advantage because the screw head proper and its slot is now situated between the radiator fins in a position which is far more inaccessible than the slot at the threaded end of the fixing screw.

With advantage the counterplate may incorporate a generally U-shaped bearing member, preferably made of metal, and an insert formed with a base and a coupling collar or like coupling element, the base being embraced by the U-section of the bearing member so that it cannot turn in relation thereto, whereas the coupling collar or like coupling element passes preferably through a hole in the web of the U-section bearing member and frictionally embraces the shaft of the fixing screw. In other words, the insert may be provided with an elastically flexible coupling collar which snugly embraces the screw shaft. For instance, the coupling collar or like coupling element may comprise at least two spring elastic blades which form a kind of slip coupling for the fixing screw.

The hole in the web of the U-section bearing member may be shaped, preferably chamfered, to facilitate insertion of the coupling collar or like cooperating part from the inside of the U-section. The cooperating edge of the hole may therefore be acute-angled in section so that a slot in the insert provided for cooperation therewith can easily snap into engagement with the application of only gentle pressure.

In order to provide location for the screwdriver engaging the screw head slot when the screw is to be pulled really tight the insert may be provided with a recess or the like for the reception of the head of the fixing screw, the walls of the recess embracing the screw head sufficiently closely within an axial length appropriate for the screwdriver to be reliably located. This permits the screw to be easily pulled tight even when the clamp must be fixed in an awkward and inaccessible position.

Preferably the base of the insert is formed with flanges which may have perpendicularly off-angled ends to form a backing in the outer region of the flanges of the U-section bearing member. Consequently the flanges of the U-section bearing member are not as likely to be deformed as would otherwise be the case when the counterplate is subjected to considerable loads.

Moreover, the ends of the U-section bearing member may arch towards the web of the U-section bearing member. Counterplates which are thus contrived are capable of making satisfactory supporting contact with radiator fins of different shapes because the proposed configuration in contact with the radiator tubes readily prevents the counterplate from turning.

A slightly modified simple embodiment of the invention which is relatively convenient to produce comprises an anti-turning device consisting of means constricting a recess formed in the counterplate for the reception of the screw head, said constriction being created for instance by one or more radially projecting ribs or like configurations which make frictional contact with the screw head.

BRIEF DESCRIPTION OF THE DRAWINGS

Several embodiments of the invention will now be described by way of example and with reference to the accompanying drawings, in which:

FIG. 1 is a view in plan of part of a radiator affixed to a wall by means of a fixing clamp according to the invention;

FIG. 2 is a fragmentary side view of the radiator according to FIG. 1 and of the clamp for securing the same to the wall;

FIG. 3 is a perspective view of the clamp;

FIG. 4 is a side view, partly in section, of the counterplate of the clamp with a fixing screw;

FIG. 5 is an end view of the counterplate viewed in direction E in FIG. 4;

FIG. 6 is a plan view of the clamping plate of the fixing clamp;

FIG. 7 is a perspective view of the U-section bearing member of the counterplate;

FIG. 8 is a side view of the insert of the counterplate;

FIG. 9 is a fragmentary top plan view, partly in longitudinal section, of the U-section bearing member in FIG. 7;

FIG. 10 is a perspective view of a slightly modified embodiment of the counterplate;

FIG. 11 is a horizontal section of the counterplate in FIG. 12, showing the fixing screw in position, and FIG. 12 is an end view of the counterplate according to FIGS 10 and 11.

DESCRIPTION OF THE PREFERRED EMBODIMENTS

FIG. 1 shows a fixing clamp 2 secured to a radiator 1. A clamping plate 3 of this clamp 2, which is clearly shown in FIG. 2, rests on a holder 4 affixed to a wall W. The clamping plate 3 has a central threaded hole 26 (FIG. 3) engaged by a fixing screw 5 in the form of a shaft 11 having a thread at one end 12 and a head 9 at the opposite end. The fixing screw 5 can be tightened to cause the radiator 1 to be gripped between the clamping plate 3 and a counter-plate 6.

FIG. 4 shows the counterplate 6 and the fixing screw 5 which has been passed through the counterplate. A preferably metallic U-section bearing member 6a contains an insert 8, the U-section bearing member and insert together constituting the counterplate 6.

Integrally formed with the insert 8 are spring blades 10 (cf. FIG. 4) which are to form a frictional retaining device and project beyond the counterplate 6 on the side facing away from the screw head 9. These spring blades 10 bear with pressure against the sides of the shaft 11 of the fixing screw 5. Consequently the counterplate 6 can be easily inserted between two neighbouring fins of the radiator by holding the threaded end 12 of the screw shaft 11 and it can then be brought into position for fixing the radiator (as shown in FIG. 1) simply by turning the screw shaft 11, since the counterplate 6 is frictionally held and turns with the fixing screw 5.

The threaded end 12 of the screw shaft 11 which projects from the radiator 1 and to which the clamping plate 3 may have been previously screwed by means of a central threaded hole 26 provided in the clamping plate 3 can now be easily pulled tight until the clamping plate 3 grips the radiator. The threaded end 12 of the screw shaft 11 is provided with a slot 13 for the reception of the blade of a screwdriver. This permits the fixing screw 5 to be pulled tight with the screwdriver as soon as the clamping plate 3 is in contact with the radiator without the necessity of having to work from the rear less accessible side. If desired the threaded end 12 of the screw shaft 11 may be provided with a hexagonal socket or with some alternative arrangement for the convenient application thereto of a correspondingly shaped tool. It is self-evident that also the head 9 at the opposite end of the shaft 11 is provided with a slot 13a or some alternative arrangement.

FIG. 8 is a separate illustration of the insert 8 and of the above-mentioned frictional retaining device. The insert is a synthetic plastics moulding since such mouldings are particularly easy to make and because they possess the inherent elasticity and the necessary coefficients of friction for the creation of such a screw retaining device.

The insert 8 consists of a base 14 formed on each of its opposite sides with a flange 15 extending in a direction parallel to the longitudinal axis of the fixing screw 5. The two flanges 15 are spaced apart a distance which permits of the reception of the screw head 9 and together with the cooperating flanges 16 of the bearing member 6a (FIG. 7) they provide a recess 25 for guiding the end of a screwdriver, the flanges 15 and 16 closely embracing the screw head 9 all-round. If desired the facing sides of the flanges 15 may be semicircularly formed and hence adapted to the peripheral shape of the screw head.

Further with reference to FIG. 8 the base 14 of the insert 8 is provided with a coupling collar or like coupling element 22 formed by two or more spring elastic blades 10. This coupling collar passes through a hole 17 in the web 7 of the U-section bearing member 6a and thus forms an orifice through which the screw shaft 11 can be pushed. The spring blades 10 are formed by one or more axial slots 18 which axially divide the coupling collar 22. To permit the collar 22 to be easily inserted into the hole 17 in the web 7 the leading end 24 of the collar is slightly coned. For securely locating the insert 8 in the counterplate 6 the coupling collar 22 is formed adjacent the base 14 with a clip-in slot 19 which fits the hole 17.

FIG. 9 shows part of the bearing member 6a in section in the neighbourhood of the hole 17. The edge 20 of the hole 17 is chamfered to facilitate insertion of the coupling collar 22 and the cooperating clip-in slot 19 in the insert 8 thus provides a reliable and preferably the only connection between the bearing member 6a and the insert 8. The insert 8 is firmly located so that it cannot turn between the flanges 16 of the bearing member 6a.

The ends of the flanges 15 of the insert 8 in the illustrated embodiment are themselves formed with perpendicularly off-angled edges 21. These off-angled edges thus form a supporting or backing face at the extremities of the flanges 16 of the bearing member 6a. The off-angled edges 21 also increase the mechanical strength of the flanges 16 of the bearing member 6a when these are subjected to major loads.

In order to permit the counterplate 6 to be used for radiators 1 of different kinds the U-section bearing member 6a is formed adjacent the web 7 with preferably convexly arched ends 23. These make satisfactory contact with differently spaced tubes or fins of diverse cross sections and they are able at least partly to enter the spaces between such tubes or fins besides being capable of providing lateral support and of also preventing the counterplate 6 from rotating.

FIGS. 10 to 12 illustrate a slightly modified form of construction of the clamp 2. Substantially this version differs from the preceding embodiment by a slightly changed design of the insert, here marked 8a. In place of a slip coupling formed by the blades 10 (see FIG. 8) in the embodiment illustrated in FIGS. 1 to 9, the arrangement according to FIGS. 10 to 12 contains an anti-turning device inside a recess 25 in the insert 8a. The recess 25 contains a plurality of ribs R which project radially into the recess 25. They are integrally formed with the insert 8a which in this embodiment also consists of a synthetic plastics material, and before reaching the outside edge 70 of the recess 25 they flatten into the wall of the recess 25, as will be readily understood from FIGS. 10 and 11. This form of construction of the ribs R facilitates the insertion of the screw head 9 which has a diameter D slightly exceeding the internal diameter $d$ between ribs R on opposite sides (FIG. 11). FIGS. 10 and 11 show the manner in which a plurality of such ribs R are provided in the recess 25 symmetrically about the longitudinal axis M of the screw 9.

For the purpose of securing the insert 8a to the bearing member 6a blades 10a of reduced length are provided. These are clearly seen in FIG. 11. They have no function as a slip coupling in this embodiment, but otherwise the same applies to the parts marked 10a, 14, 19 and 20 above described with reference to FIGS. 10 to 12 and to the parts 10, 14, 19, 20 and 24 (cf. FIGS. 7 and 8). The embodiment according to FIGS. 10 to 12 has the special advantage of being more compact and simpler to manufacture.

All the features and parts mentioned in the description and in the following claims and illustrated in the drawings may be of the essence of the invention severally or in any combination.

What is claimed is:

1. A fixing clamp for securing radiators having projecting portions, particularly fin- or tube-like projecting portions, to a support, comprising a clamping plate adapted to be positioned against the side of the radiator which faces the support and adapted to be secured to said support; a counter-plate having a bearing member and a plastic insert each having cooperating snap-in engaging portions to form a mechanical connection, said insert being securely mounted in said bearing member so as to form a unit adapted to assume a first fitting position in which said unit fits loosely between two adjacent projecting portions of the radiator and a second fixed position in which said unit is wedged between said adjacent portions; a fixing screw mounted on said plates and having a coupling portion; and slip-coupling means on said insert for frictionally engaging said coupling portion of said screw so that when said screw is initially turned in requisite direction, said counter-plate is moved from said first to said second position, and further turning of said screw causes said coupling portion to slip with respect to said counter-plate and moves said plates towards each other so as to clamp said adjacent portions therebetween.

2. A clamp according to claim 1, wherein the insert is provided with a recess for the reception of the head of the fixing screw, the recess closely surrounding said head so as to form a locating surface for the end of a screwdriver.

3. A clamp according to claim 1, wherein said insert is made of synthetic plastics material.

4. A clamp according to claim 1, wherein said fixing screw has a head portion and an axially spaced opposite threaded end portion which is provided with a traverse slot for the application of a tool thereto.

5. A clamp according to claim 1, wherein said bearing member is formed of metal and comprises two flanges connected by a web which define a generally U-shaped configuration, and wherein said insert is formed with a base which is embraced by the U-shaped configuration of said bearing member so that said insert cannot turn in relation to said bearing member; and wherein said slip-coupling means comprises a coupling collar.

6. A clamp according to claim 5, wherein the U-shaped bearing member is formed with ends which arch towards the web of the U-shaped bearing member.

7. A clamp according to claim 5, wherein said coupling portion is the shaft of said screw, and wherein said web of said U-shaped bearing member has a hole through which said coupling collar passes, said collar frictionally embracing said shaft of said fixing screw.

8. A clamp according to claim 7, wherein said coupling collar comprises at least two spring blades which cause said coupling portion of said fixing screw to slip relative to said blades.

9. A clamp according to claim 5, wherein said coupling collar has an axial slot, and a coned front end and a snap-in engaging base end which are formed of resilient material, said collar being inwardly elastically slightly flexible by the presence of said axial slot, and wherein said web of said U-shaped bearing member has snap-in engaging cooperating edge portions defining a hole, said snap-in engaging base end of said coupling collar being provided with an annular slot which receives said cooperating edge portions of said bearing member so as to form a mechanical snap-in connection at the transition between said coupling collar and said base of said insert.

10. A clamp according to claim 9, wherein said edge portions of said hole in said web of said U-shaped bearing member is chamfered to facilitate insertion of said coupling collar from the inside of said U-shaped member.

11. A clamp according to claim 5, wherein said screw has an axially spaced head portion; and wherein said base of said insert is formed with flanges extending in the direction of the axis of said fixing screw and dimensioned to correspond with said flanges to said U-shaped bearing member so as to closely embrace said head of said fixing screw from all sides.

12. A clamp according to claim 1, wherein said coupling portion is the head portion of said screw; and wherein said insert is formed with a recess to receive said head coupling portion of said screw; and wherein said slip-coupling means includes means for constricting said recess so that said head portion is frictionally secured therein.

13. A clamp according to claim 12, wherein the flanges of the insert have perpendicularly off-angled ends which form a backing surface on the outside of the flanges of the U-shaped bearing member.

14. A clamp according to claim 12, wherein said constricting means comprises at least one radially projecting rib which frictionally grips said head portion of said screw.

15. A clamp according to claim 12, wherein said constriction means comprises additional ribs symmetrically disposed in said recess, said ribs being integrally formed with said insert.

16. A clamp according to claim 15, wherein the end of said ribs extending towards the edge of said recess flattens and merges into the circumferential surface of said recess.

* * * * *